(12) United States Patent
Oldenettel et al.

(10) Patent No.: US 8,272,627 B2
(45) Date of Patent: Sep. 25, 2012

(54) AIR SPRING DEVICE

(75) Inventors: Holger Oldenettel, Resse (DE); Mark Philipps, Cremlingen (DE)

(73) Assignee: Continental Aktiengesellschaft, Hanover (DE)

( * ) Notice: Subject to any disclaimer, the term of this patent is extended or adjusted under 35 U.S.C. 154(b) by 662 days.

(21) Appl. No.: 12/513,919

(22) PCT Filed: Sep. 21, 2007

(86) PCT No.: PCT/EP2007/060038
§ 371 (c)(1),
(2), (4) Date: May 7, 2009

(87) PCT Pub. No.: WO2008/055744
PCT Pub. Date: May 15, 2008

(65) Prior Publication Data
US 2010/0001446 A1    Jan. 7, 2010

(30) Foreign Application Priority Data
Nov. 7, 2006    (DE) .......................... 10 2006 052 314

(51) Int. Cl.
*F16F 5/00* (2006.01)
*F16F 9/04* (2006.01)

(52) U.S. Cl. .................. 267/122; 267/64.21; 267/64.19; 267/64.23; 267/64.24; 267/64.27

(58) Field of Classification Search .................. 267/122, 267/64.21, 64.19, 64.23, 64.24, 64.27
See application file for complete search history.

(56) References Cited

U.S. PATENT DOCUMENTS 3,438,309 A * 4/1969 Boileau ....................... 92/103 R
6,637,733 B1 * 10/2003 Weitzenhof et al. ........ 267/64.27
6,752,388 B2 * 6/2004 Thurow ......................... 267/122

FOREIGN PATENT DOCUMENTS

| DE | 19753637 | 6/1998 |
| DE | 29823508 | 8/1999 |
| DE | 10163819 | 7/2009 |

* cited by examiner

Primary Examiner — Lesley D Morris
Assistant Examiner — Syed A Islam
(74) Attorney, Agent, or Firm — Brinks Hofer Gilson & Lione

(57) ABSTRACT

Disclosed is an air spring device having a free-standing air spring bellows and an outer guide which is fastened to the air spring bellows by means of an inner clamping ring, wherein the outer diameter of the inner clamping ring is greater than the outer diameter of the air spring bellows in the unpressurized state, and the inner clamping ring generates a radially outwardly pointing encircling bulge in the unpressurized air spring bellows.

5 Claims, 5 Drawing Sheets

AIR SPRING DEVICE

BACKGROUND OF THE INVENTION

The invention relates to an air spring device having an air spring bellows made of elastomer material, an air spring cover and an air spring piston, wherein the air spring bellows which is essentially self-supporting in the operating state is attached in an airtight fashion by its first end the air spring piston so as to form a first rolling fold, and by its second end to the air spring cover so as to form a second (rolling) fold, and together with the air spring cover and the air spring piston forms a hollow chamber with an elastic volume, wherein the air spring device has a sleeve-shaped external guide which surrounds the air spring bellows tangentially, and at least one internal clamping ring which is arranged inside the air spring bellows, wherein the external guide is to be attached in a frictionally and/or positively locking fashion to the external surface of the air spring bellows using the internal clamping ring. The invention also relates to a particularly suitable method for manufacturing an air spring bellows for such an air spring device.

Air spring devices, also referred to for short as air springs, which are clamped between the chassis and vehicle body and which have an air spring bellows which is in turn attached between an air spring cover, for example on the chassis side, and a rolling piston on the vehicle body side are known in a large number of designs. The air spring is subject to an internal excess pressure during operation. The air spring bellows rolls under load and in the case of spring movements so as to form a rolling fold on the external contour of a concentric component, usually on the air spring piston/rolling piston. Such an air spring is frequently used in road vehicles or rail vehicles in order to provide comfortable suspension. The air spring is subject to an internal excess pressure during operation.

In this context, there are both air springs in which the air spring bellows forms a rolling fold only on one side, specifically generally on the rolling piston, or air springs in which the rolling bellows is clamped between an air spring cover and rolling piston so as to form a (rolling) fold on both sides. Air springs with a rolling fold on one side can often be found in passenger cars, while the often larger air springs with a greater load-bearing capacity with rolling folds on both sides tend to be installed in trucks and rail vehicles.

In addition, thin, i.e. thin-walled, rolling bellows are desired to increase a comfortable suspension behavior and to reduce what is referred to as the harshness behavior. A person skilled in the art understands the term harshness to mean a superimposed, somewhat rough, hard suspension behavior when relatively high-frequency and low-amplitude oscillations occur, which arises as a result of the dependencies of the designs, materials, intrinsic damping means, inertia, etc. which are customary with air spring units and shock absorber units.

In order, however, to obtain a sufficient load-bearing capacity of the overall system in relatively thin rolling bellows, the rolling bellows or the air springs or shock absorbers have to be provided with what are referred to as external guides, specifically with a tubular "supporting corset" or supporting body which surrounds the rolling bellows. In this way it is possible to optimize, for example, a thin rolling bellows with a thin lightweight metal tube as a supporting body to high internal pressures and therefore high load-bearing capacities accompanied at the same time by good harshness behavior.

The external guides are arranged in such a way that the rolling bellows can roll both on the outside of the rolling piston and on the internal surface of the external guide.

When spring movements occur, the air spring bellows in air springs with a double fold, as well as in those with just one fold, therefore usually rolls essentially on the external contour of the air spring piston while retaining the rolling fold. In air springs with a double rolling fold or a rolling fold on both sides, a situation in which the rolling fold which is located on the air spring cover rolls on cover components is minimized by corresponding shaping of the cover, or is entirely prevented so that a continuously defined position of the individual elements of the air spring device is ensured.

Those air springs in which the air spring bellows forms a rolling fold only on one side generally have different diameters in the different regions of attachment of the air spring to the air spring cover and to the air spring piston. For example, the air spring bellows of the air spring system disclosed in DE 197 53 637 is attached to an air spring cover having a relatively large diameter, and is attached to a significantly smaller rolling piston in such a way that just one rolling fold is formed. With this design it is easily possible for an external guide in the form of a sleeve which surrounds the air spring bellows and is supported on the outside to be attached to the larger diameter of the air spring cover. The attachment as such can easily be carried out by means of clamping rings on the fixed cover, and the large diameter of the external guide allows sufficient space to form the rolling fold.

However, if the external guide, for example in the case of a double rolling fold, has to be held only by the air spring bellows itself, the attachment becomes rather difficult, in particular if a long service life is required. Although solutions which propose a method of attachment such as bonding or vulcanizing are achievable, they do not always provide the desired durability.

DE 298 23 508 U1 presents such a method of attachment and, in addition to bonding and vulcanizing also discloses the alternatives of crimping or clamping by widening an internal clamping ring. However, due to a lack of more detailed specification, the widening process described in said document should only be considered to be a theoretical possibility for an attachment method. On the one hand, a position which is uniform over the circumference and a sufficient degree of extension of a clamping ring for the purpose of mounting are virtually impossible if a clamping ring is inserted into the air spring bellows when the latter is still in the unloaded state. On the other hand, introducing a clamping ring into an air spring bellows which is already widened under internal pressure has not yet been carried out and is assumed to be feasible only with a very large degree of expenditure.

SUMMARY OF THE INVENTION

The object of the invention has therefore been to make available an essentially self-supporting air spring with a double fold and external guide, in which the external guide can be attached reliably, simply and without a high degree of expenditure on mounting and with which configuration for a long service life of the vehicle is unproblematic.

This object is achieved as follows: The external diameter of the internal clamping ring is larger than the external diameter of the air spring bellows in the pressure-relieved state, and the internal clamping ring in the pressureless air spring bellows produces a circumferential protrusion which points radially outward and corresponds essentially to the internal diameter of the external guide. As a result, it is easily possible to connect securely a self-supporting air spring to an external guide/external guide sleeve. By virtue of the internal clamping ring which is already positioned inside the air spring bellows in the supplied state or mounted state and is secured by the restoring forces of the air spring bellows and by virtue of the fixed annular shape/kettle shape which is therefore provided at a point on the rolling bellows, the external guide can be attached by means of simple methods, for example shrinking on, clamping on, heat shrinking, bonding, etc. The fixed annular shape also ensures the durability of the connection over its service life.

One advantageous development consists in the fact that the air spring cover and the air spring piston have essentially as identical diameter in the respective attachment region of the ends of the air spring bellows. As a result, the air spring bellows becomes easy to use for self-supporting air springs of any dimensions, in particular if the external diameter of the internal clamping ring is larger than the diameter of the respective attachment regions of the air spring cover and air spring piston.

A further advantageous development consists in the fact that the external guide is clamped to the external surface of the air spring bellows using an internal clamping ring which can be compressed or spread. The clamping effect, which is made possible merely by the shape of the bellows which according to the invention is made to protrude radially outward by means of an internal clamping ring, can therefore be enhanced even more.

A further advantageous development consists in the fact that the external diameter of the internal clamping ring is at least 15 mm, preferably 20 mm, larger than the external diameter of the air spring bellows in the manufactured state. The connection of the external guide to the air spring bellows which is achieved in this way provides a reliable method of attachment in all driving states with rolling bellows which are customary for passenger cars and trucks.

A particularly suitable method for manufacturing an air spring bellows, provided with an internal clamping ring, for an air spring device according to the invention consists in the fact that the air spring bellows is provided with the internal clamping ring using a folding-over method, wherein a) the air spring bellows is applied in such a way that it bears on an essentially cylindrical inflating bellows and at least partially surrounds the latter and is connected in an airtight fashion by at least one of its ends to end pieces which are associated with the inflating bellows, wherein at least one of the end pieces is embodied in a pot-shape in such a way that it surrounds the inflating bellows, and at least one of the end pieces of the inflating bellows is embodied in such a way that it can move relative to the other end piece and shortens the length of the inflating bellows, b) the inflating bellows is placed under internal pressure in order to widen the air spring bellows bearing against it, c) when the inflating bellows or air spring bellows are inflated, the end pieces are moved together, with the effect of shortening the effective length of the inflating bellows or shortening the distance between the end pieces, to such an extent that one end of the inflating bellows or air spring bellows is turned/folded over the pot-shaped end in the form of a folded-over portion, d) the inflating bellows is partially pressure-relieved with partial reversing of the shortening, as a result of which the widening and the folding over of the inflating bellows are reversed but the folded-over portion of the air spring bellows is retained, e) the internal clamping ring is positioned over the inflating bellows and at the clamping point which is provided inside the air spring bellows, f) the inflating bellows is completely pressure-relieved and the end pieces are moved apart from one another with the effect of increasing the effective length of the inflating bellows, g) the folded-over part of the air spring bellows is placed under air pressure, wherein the folded-over portion of the air spring bellows is folded back and the air spring bellows which is returned to its initial position/manufactured state secures the internal clamping ring so as to form a radially outwardly pointing, circumferential protrusion, after which h) the air spring bellows is removed from the fabricating mandrel/from the end pieces.

Such a method provides the possibility of manufacturing air spring bellows which are ready for mounting and are intended for use in the air spring devices according to the invention using at least semi-automatic fabrication devices and in an easy way.

The inflating bellows can in this case advantageously enclose a fabricating mandrel which has a variable length, therefore reducing the quantity of pressure medium for the inflation and folding-over processes.

One advantageous development of the method consists in the fact that, in a predefined inflated state, the inflating bellows serves as a mounting guide for the internal clamping ring. This permits dispensing with separate feed devices or guide devices for precisely positioning the internal clamping ring. The internal clamping ring then drops, guided by the inflating bellows, as far as the internal circumference of the folded-over portion of the air spring bellows, i.e. as far as the clamping point, and is secured when the air spring bellows is folded back.

The invention will be explained in more detail on the basis of an exemplary embodiment.

DETAILED DESCRIPTION OF THE DRAWINGS

Figure 1:
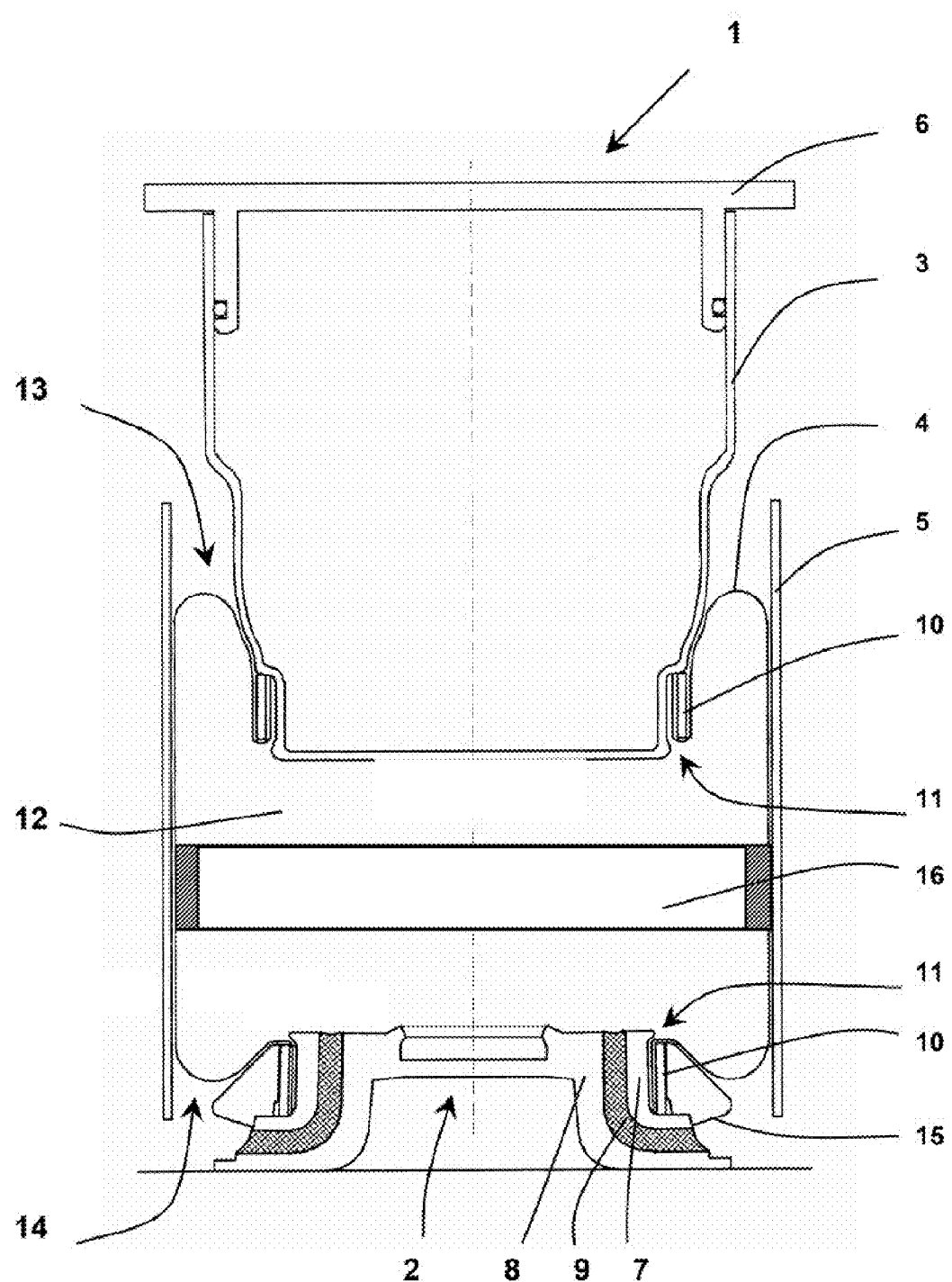
FIG. 1 shows an air spring device according to the invention.

FIG. 1 shows an inventive air spring device 1 which has an air spring cover 2 which is arranged at the bottom here, an air spring piston 3 which is arranged in the upper part, and an air spring bellows 4. The air spring bellows 4 is surrounded by a sleeve-shaped external guide 5. The air spring piston has an upper connecting part 6 for connecting to a vehicle body, for example.

The air spring cover 2 is constructed in two parts and has an internal cone 7 and a base part 8, which are permanently vulcanized together by means of a rubber layer 9.

The air spring bellows 4 is pressed in an airtight fashion onto clamping seats 11 of the air spring piston 3 and of the internal cone 7 of the air spring cover 2 using clamping rings 10 in each case, and it forms, between the air spring piston 3 and air spring cover 2, a cavity 12 which has an elastic volume and to which an excess pressure can be applied. This excess pressure ensures that the air spring bellows 4 forms a rolling fold 13 and a further fold 14. The rolling fold 13 rolls on the air spring piston when there are axial relative movements of the air spring piston 4 and the air spring cover 2. In the case of the fold 14, rolling on the air spring cover is minimized or entirely prevented by corresponding shaping of the cover. For this purpose, the air spring bellows 4 is supported on the cover side by a shaping ring 15, with the result that it does not roll too much over the air spring cover 2. The excess pressure in the cavity 12 also presses the air spring bellows 4 against the external guide 5 from the inside. The air spring bellows 4 is thereby supported, with the result that its radial extent does not exceed the degree which is predefined by the external guide 5 and determines the spring characteristics to a considerable degree.

The air spring device 1 has an internal clamping ring 16 which is made of aluminum and with which the sleeve-shaped external guide 5, which is also composed of aluminum, is attached to the air spring bellows 4 and surrounds it. Such a stable external guide makes it possible to use a relatively thin bellows which has good harshness behavior.

Figure 2:
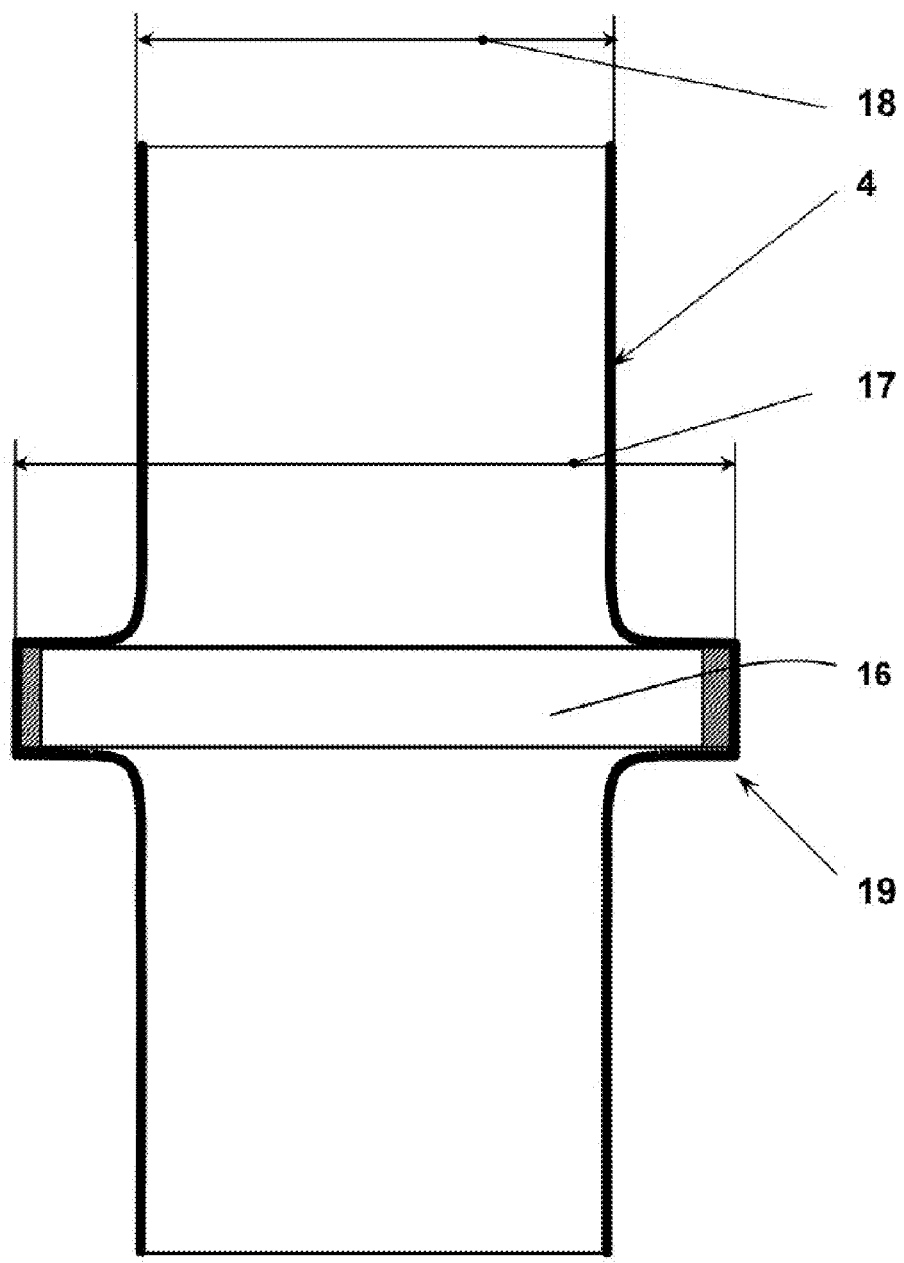
FIG. 2 shows an air spring bellows in the pressureless installation state/mounted state.

FIG. 2 shows an air spring bellows 4 in principle in the pressureless installation state/mounted state with the internal clamping ring 16 already inserted. The external diameter 17 of the internal clamping ring 16 is significantly larger than the external diameter 18 of the air spring bellows 4 in the pressure-relieved state. The internal clamping ring therefore generates, in the pressureless air spring bellows, a radially outwardly pointing, circumferential protrusion 19 which corresponds essentially to the internal diameter of the external guide 5 which is applied later.

FIG. 2 shows, in conjunction with FIG. 1, that the air spring cover 2 and the air spring piston 3 have essentially the same diameter in the respective attachment region or clamping seat 11 for the ends of the air spring bellows 4, specifically approximately the external diameter 18 of the air spring bellows 4 in the pressure-relieved state. The external diameter 17 of the internal clamping ring 16 is likewise larger here than the diameter of the respective attachment regions.

The excess pressure which is applied in the cavity 12 and under load after mounting then changes the air spring bellows 4 from the shape illustrated in FIG. 2 into the shape illustrated in FIG. 1 accompanied by formation of the rolling folds, and presses against the external guide 5 from the inside.

Figure 3:
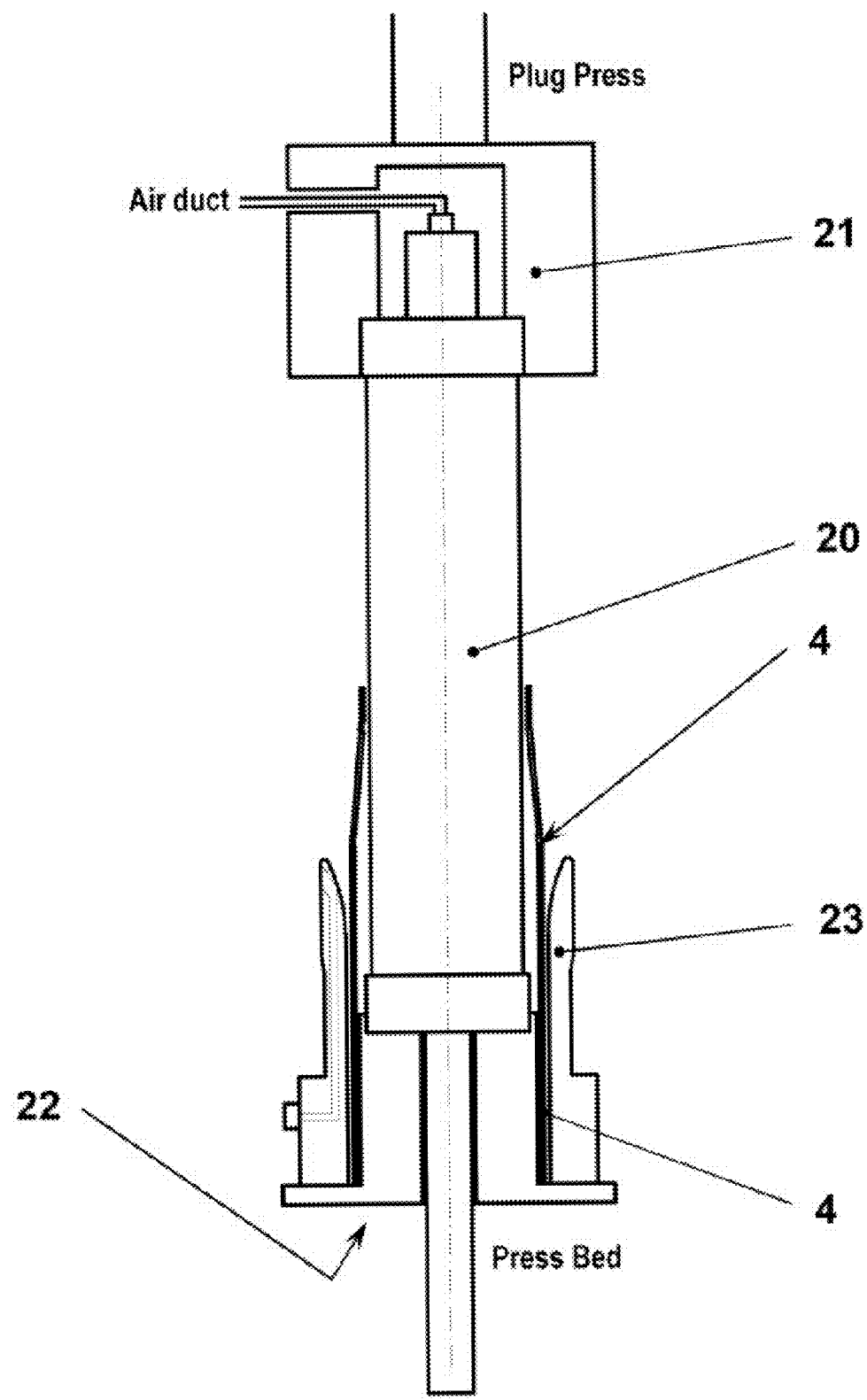
FIGS. 3-5 show the method according to the invention for manufacturing an air spring bellows provided with an internal clamping ring, in the form of basic outlines.
Figure 4:
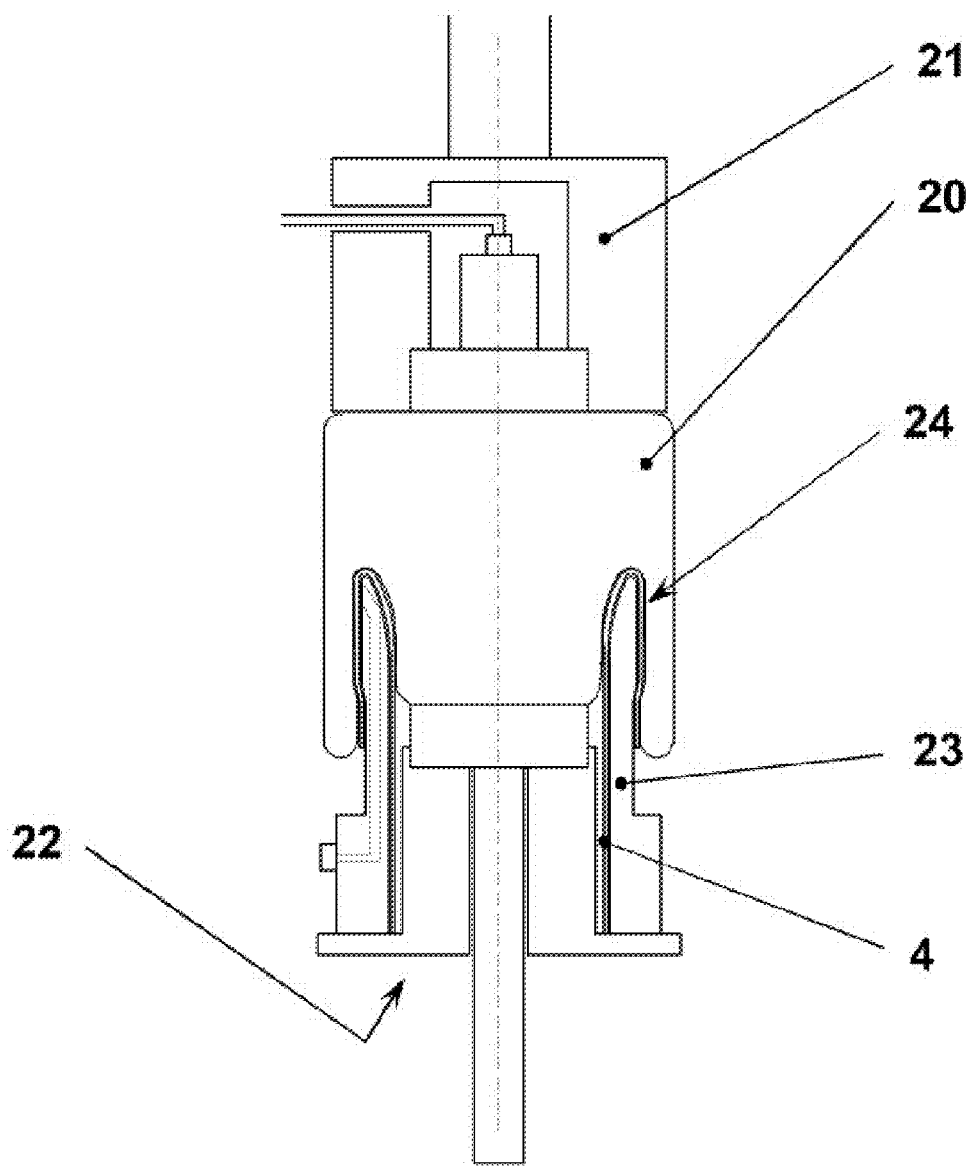
Figure 5:
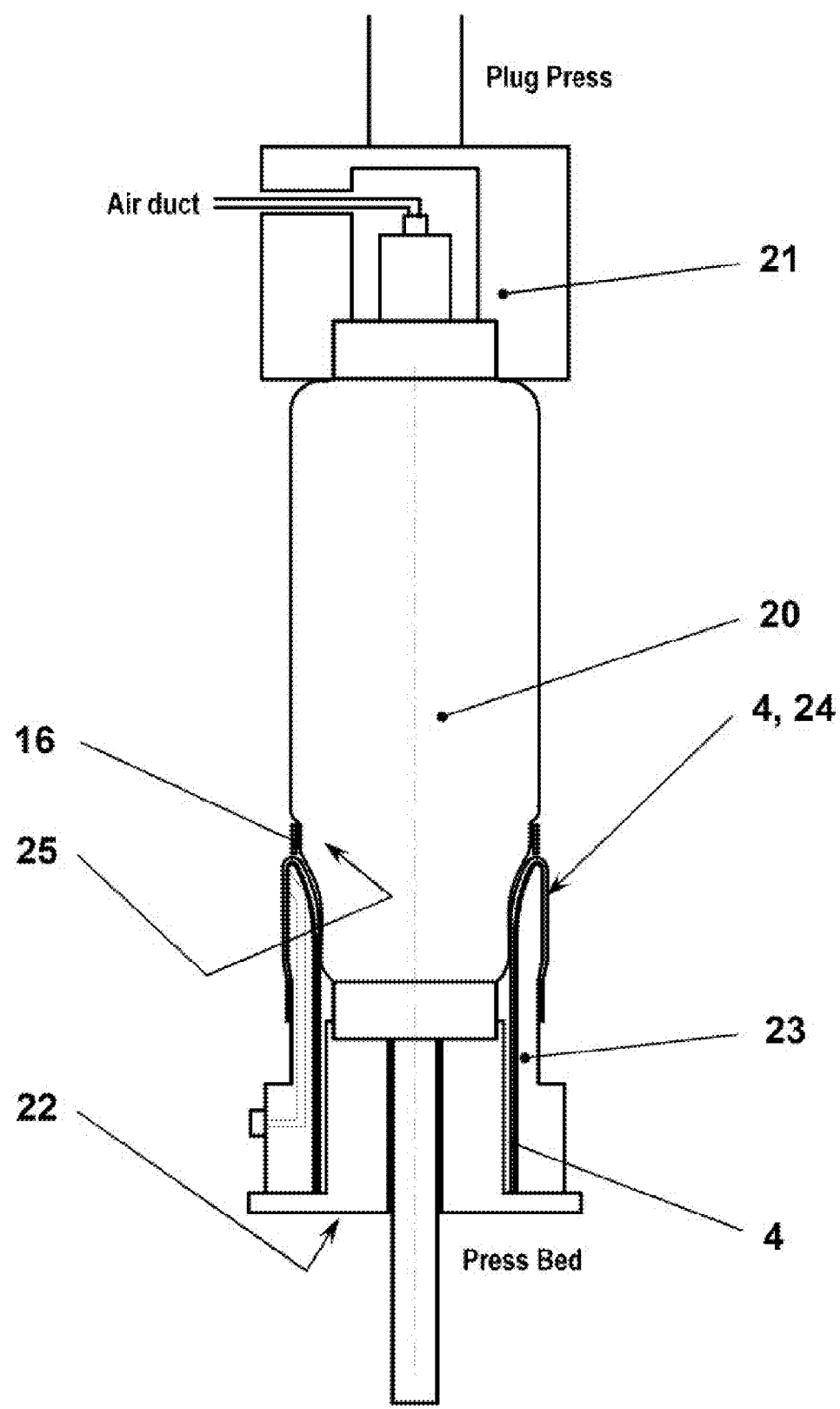

FIGS. 3 to 5 show, by means of basic outlines, the method according to the invention for manufacturing an air spring bellows which is provided with an internal clamping ring and is intended for an air spring device according to the invention. The method comprises, as is explained in more detail below, providing the air spring bellows with the internal clamping ring using a particular folding-over method.

FIG. 3 shows the air spring bellows 4 in the form in which it is applied in such a way that it bears on an essentially cylindrical inflating bellows 20 and surrounds the latter at its lower end. The air spring bellows 4 is connected in an airtight fashion here and by its lower end to the lower of the end pieces 21 and 22 which are associated with the inflating bellows 20. The lower end piece 22 surrounds the bellows, that is to say the inflating bellows 20 and the applied air spring bellows 4, in the form of a pot with a folded-over collar 23.

At least one of the end pieces 21, 22 of the inflating bellows can be moved relative to the other end piece, as a result of which the length of the inflating bellows or the distance between the end pieces 21 and 22 can be shortened during the folding-over/turning-over process.

FIG. 4 then shows how the inflating bellows 20 is subjected to internal pressure in order to widen the applied air spring bellows 4, and, when the inflating bellows or air spring bellows is inflated, the end pieces are already moved together accompanied by shortening of the distance between the end pieces 21 and 22. In this context, the lower end of the inflating bellows 20 or air spring bellows 4 is turned/folded over in the form of a folded-over portion 24 over the pot-shaped end which is embodied as a folded-over collar 23.

The inflating bellows 20 is then, as is shown by FIG. 5, partially pressure-relieved with partial, specifically almost complete reversal of the shortening, as a result of which the widening and the folding over of the inflating bellows are reversed. However, the folded-over portion 24 of the air spring bellows 4 is retained. In this state, the internal clamping ring 16 is pushed from above over the inflating bellows and positioned at the clamping point 25 which is provided inside the air spring bellows.

This is followed by a further concluding step (not illustrated in more detail here) during which the inflating bellows is completely pressure-relieved and moved back into the state illustrated in FIG. 1. The end pieces are then completely moved apart from one another again and into their respective end point, and the inflating bellows resumes its maximum length.

The folded-over part of the air spring bellows 4 is then subjected to air pressure using air ducts which run inside the folded-over collar and emerge under the folded-over portion, wherein the folded-over portion 24 of the air spring bellows 4 folds back, and the air spring bellows 4 which has been returned to its initial state/mounted state secures the internal clamping ring while forming a radially outwardly pointing, circumferential protrusion 19, as is shown in FIG. 2. The air spring bellows is then removed from the inflating bellows/ from the end pieces and is then installed, with the external guide 5, in the air spring device 1.

LIST OF REFERENCE NUMERALS (Part of the Description)
1 Air spring device
2 Air spring cover
3 Air spring piston
4 Air spring bellows
5 External guide
6 Connecting part
7 Internal cone
8 Base part
9 Rubber layer
10 Clamping ring
11 Clamping seat/attachment region
12 Cavity
13 Rolling fold
14 Fold
15 Shaping ring
16 Internal clamping ring
17 External diameter of the internal clamping ring
18 External diameter of the air spring bellows
19 Protrusion
20 Inflating bellows
21 End piece
22 End piece
23 Folded-over collar
24 Folded-over portion
25 Clamping point

The invention claimed is:

1. An air spring device (1) having an air spring bellows (4) made of elastomer material, an air spring cover (2) and an air spring piston (3), the air spring bellows (4) having an operating state in which it is substantially self-supporting and being attached in an airtight fashion by a first end to the air spring piston (3) so as to form a first rolling fold (13), and by a second end to the air spring cover (2) so as to form a second rolling fold (14), and together with the air spring cover (2) and the air spring piston (3) forming a hollow chamber (12) with an elastic volume, the air spring device (1) having a sleeve-shaped external guide (5) with an axial section of constant internal diameter, the external guide (5) tangentially surrounding the air spring bellows (4) between the first rolling fold (13) and the second rolling fold (14), and at least one internal clamping ring (16) which is arranged inside the air spring bellows (4), the external guide (5) being fastened to an external surface of the air spring bellows (4) within the axial section of constant internal diameter using the internal clamping ring (16), wherein the internal clamping ring (16) has an external diameter (17) and the air spring bellows has an external diameter, wherein the external diameter (17) of the internal clamping ring (16) is larger than the external diameter (18) of the air spring bellows (4) in a unassembled state, and the internal clamping ring (16) produces a circumferential, radially outward protrusion (19) when the air spring bellows is unpressurized, which protrusion has a diameter corresponding substantially to the internal diameter of the external guide (5), and wherein the internal clamping ring is secured relative to the air spring bellows by radial restoring forces of the air spring bellows.

2. The air spring device as claimed in claim 1, wherein the second end attached to the air spring cover (2) and first end attached to the air spring piston (3) have diameters smaller than the external diameter (17) of the internal clamping ring (16).

3. The air spring device as claimed in claim 1, wherein the second end attached to the air spring cover (2) and first end attached to the air spring piston (3) have a substantially identical diameter (11).

4. The air spring device as claimed in claim 1, wherein internal clamping ring has an external diameter configured to be reduced and enlarged.

5. The air spring device as claimed in claim 1, wherein the external diameter (17) of the internal clamping ring (16) is at least 15 mm larger than the outer diameter (18) of the air spring bellows (4) in the unassembled state.

* * * * *